US012735019B2

(12) United States Patent
Lee

(10) Patent No.: US 12,735,019 B2
(45) Date of Patent: Sep. 15, 2026

(54) MEASUREMENT APPARATUS AND EMB DEVICE INCLUDING SAME

(71) Applicants: Hyundai Motor Company, Seoul (KR); Kia Corporation, Seoul (KR)

(72) Inventor: Kyu Hwan Lee, Gimpo-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 348 days.

(21) Appl. No.: 18/414,207

(22) Filed: Jan. 16, 2024

(65) Prior Publication Data

US 2025/0100531 A1 Mar. 27, 2025

(30) Foreign Application Priority Data

Sep. 27, 2023 (KR) ........................ 10-2023-0130255

(51) Int. Cl.

| | |
|---|---|
| ***B60T 17/22*** | (2006.01) |
| ***B60T 8/171*** | (2006.01) |
| ***B60T 8/172*** | (2006.01) |
| ***B60T 13/74*** | (2006.01) |
| ***F16D 55/226*** | (2006.01) |
| ***F16D 65/18*** | (2006.01) |
| ***F16D 66/00*** | (2006.01) |

(Continued)

(52) U.S. Cl.

CPC ............ *B60T 17/22* (2013.01); *B60T 13/746* (2013.01); *F16D 55/226* (2013.01); *F16D 65/18* (2013.01); *F16D 66/00* (2013.01); *G01L 3/108* (2013.01); *B60T 8/171* (2013.01); *B60T 8/172* (2013.01); *F16D 2066/005* (2013.01); *F16D 2066/006* (2013.01); *F16D 2121/24* (2013.01)

(58) Field of Classification Search

CPC ........ B60T 17/22; B60T 13/746; B60T 8/171; B60T 13/74; F16D 55/226; F16D 65/18; F16D 66/00; F16D 2066/005; F16D 2066/006; F16D 2121/24; G01L 3/108; B60Y 2400/301; B60Y 2400/81

See application file for complete search history.

(56) References Cited

U.S. PATENT DOCUMENTS

| | | | | |
|---|---|---|---|---|
| 3,900,083 A * | 8/1975 | Hauth | F16D 55/228 | 188/71.9 |
| 4,136,304 A * | 1/1979 | Baechler | F16D 65/14 | 188/162 |

(Continued)

FOREIGN PATENT DOCUMENTS

| | | |
|---|---|---|
| JP | 2021 117231 A | 8/2021 |
| KR | 10 1310172 B1 | 9/2013 |

(Continued)

*Primary Examiner* — Henry Y Liu

(74) *Attorney, Agent, or Firm* — MORGAN, LEWIS & BOCKIUS LLP

(57) ABSTRACT

An electromechanical braking device includes: a housing unit provided with a braking force generating unit therein; a power generating unit configured for providing driving force for braking force required by the braking force generating unit; and a measurement apparatus including one end portion connected to one side of the housing unit and the other end portion connected to the power generating unit, wherein braking torque is determined using axial reaction force generated by driving force greater than or equal to a rotation limit amount generated from the power generation unit.

20 Claims, 7 Drawing Sheets

(51) Int. Cl.
*F16D 121/24* (2012.01)
*G01L 3/10* (2006.01)

(56) References Cited

U.S. PATENT DOCUMENTS 4,532,462 A * 7/1985 Washbourn ............. F16D 65/28 318/362
4,546,298 A * 10/1985 Wickham ................ F16D 65/54 318/362
4,716,994 A * 1/1988 Iwamoto ................... B60T 8/52 188/1.11 R
5,969,270 A * 10/1999 Doemes .................. G01L 1/142 73/862.626
5,979,995 A * 11/1999 Miyazaki ................ B60T 8/171 303/112
6,008,604 A * 12/1999 Maisch ................... B60T 8/172 188/162
6,050,126 A * 4/2000 Miyazaki .............. G01L 5/1627 73/11.07
6,164,119 A * 12/2000 Miyazaki .............. G01L 5/1627 73/11.07
6,176,352 B1 * 1/2001 Maron .................... G01L 5/225 188/72.1
6,311,541 B1 * 11/2001 Miyazaki .............. G01L 5/0019 73/11.07
6,668,983 B2 * 12/2003 Drennen ............... F16D 55/227 188/181 T
6,701,780 B2 * 3/2004 Hofmann .............. G01M 13/04 73/146
7,117,748 B2 * 10/2006 Baumann ................ G01L 5/225 73/779
7,191,642 B2 * 3/2007 Paulsen ................... B60T 17/22 73/132
7,726,748 B2 * 6/2010 Zumberge ............. B60T 13/741 303/155
7,813,860 B2 * 10/2010 Horiuchi ................. F16D 66/00 701/80
8,146,715 B2 * 4/2012 Baier-Welt .............. F16D 66/00 188/73.1
8,172,048 B2 * 5/2012 Jonsson .................. F16D 66/02 188/158
8,326,505 B2 * 12/2012 Cesario ................... B60T 13/74 703/2
8,348,024 B2 * 1/2013 Yamaguchi ........... B60T 13/741 188/72.3
8,752,909 B2 * 6/2014 Koyama ............... F16D 65/092 188/72.3
9,518,625 B2 * 12/2016 Putz ........................ F16D 65/18
10,138,964 B2 * 11/2018 Lee ....................... F16D 55/226
10,227,064 B2 * 3/2019 Serra ..................... F16D 65/092
10,233,984 B2 * 3/2019 Evans, Jr. ............. F16D 66/021
10,479,181 B2 11/2019 Finkenzeller et al.
10,507,816 B2 * 12/2019 Kilmurray ............ B60T 13/741
10,773,703 B2 * 9/2020 Lohberg ................ F16D 55/228
11,209,055 B2 * 12/2021 Arienti .................. F16D 65/183
11,441,629 B2 * 9/2022 Solari ..................... F16D 65/08
11,448,275 B2 * 9/2022 Michels ................ B60T 15/041
11,623,620 B2 * 4/2023 Putz .......................... B60T 8/17 188/71.8
11,623,626 B2 * 4/2023 Dossi .................... B60T 13/741 701/70
11,661,987 B2 * 5/2023 Serra ......................... G01L 1/16 701/32.3
11,740,145 B2 * 8/2023 Macchi ................... B60T 17/00 73/862.12
11,794,707 B2 * 10/2023 Serra ......................... B60T 8/52
11,884,152 B2 * 1/2024 Saito ....................... B60T 17/22
12,055,455 B2 * 8/2024 Macchi ................. B60T 17/221
12,071,994 B2 * 8/2024 Solari ................... F16D 66/021
12,162,452 B2 * 12/2024 Camozzi ................. B60T 17/22
12,221,081 B2 * 2/2025 Zabulon .................... G01P 3/46
12,233,829 B2 * 2/2025 Milanesi ............. F16D 65/0062
12,345,306 B2 * 7/2025 Camozzi ................. G01L 5/162
12,486,880 B2 * 12/2025 Camozzi ................. B60T 17/22
12,590,853 B2 * 3/2026 Serra ..................... F16D 65/092
2003/0111305 A1 * 6/2003 Drennen ............... F16D 65/095 188/73.44
2003/0145651 A1 * 8/2003 Hofmann ............. B60T 13/662 73/146
2005/0029056 A1 * 2/2005 Baumgartner ........ B60T 13/741 188/1.11 L
2005/0172706 A1 * 8/2005 Paulsen ................... B60T 17/22 73/121
2007/0068237 A1 * 3/2007 Zumberge ............... F16D 66/02 73/121
2008/0092641 A1 * 4/2008 Cahill ....................... B60T 8/52 73/121
2008/0288147 A1 * 11/2008 Cesario ................ G05B 13/048 701/70
2009/0133971 A1 * 5/2009 Baier-Welt ............. F16D 66/00 188/1.11 E
2009/0145699 A1 * 6/2009 Jonsson .................. F16D 66/02 188/1.11 E
2009/0159375 A1 * 6/2009 Vitali ...................... B60T 13/74 188/250 R
2009/0320579 A1 * 12/2009 Ante ....................... F16D 55/22 73/121
2015/0136543 A1 * 5/2015 Selles ..................... F16D 65/14 188/162
2016/0053839 A1 * 2/2016 Putz ...................... B60T 13/065 701/74
2016/0114773 A1 * 4/2016 Mol ........................ B60T 8/171 701/71
2016/0153510 A1 * 6/2016 Rothfuss ................. F16D 66/00 188/1.11 E
2017/0267220 A1 * 9/2017 Serra ......................... B60T 8/52
2017/0321773 A1 * 11/2017 Lee ....................... F16D 55/226
2018/0056962 A1 * 3/2018 Kilmurray .............. B60T 7/042
2018/0326967 A1 * 11/2018 Lohberg .................. F16D 66/00
2019/0111900 A1 * 4/2019 Engel .................... B60T 8/1701
2019/0241166 A1 * 8/2019 Serra ..................... F16D 65/092
2019/0351889 A1 * 11/2019 Serra ....................... F16D 66/00
2020/0158197 A1 * 5/2020 Arienti ................ F16D 65/0056
2020/0173508 A1 * 6/2020 Michels .................. B60T 11/34
2020/0307529 A1 * 10/2020 Putz .................... F16D 55/2255
2020/0391705 A1 * 12/2020 Zabulon .................... G01P 3/46
2021/0146776 A1 5/2021 Bollinger et al.
2021/0229679 A1 7/2021 GieBibl et al.
2021/0291654 A1 * 9/2021 Saito ....................... B60T 17/22
2021/0380089 A1 * 12/2021 Dossi ...................... B60T 7/107
2022/0242383 A1 * 8/2022 Camozzi ................. B60T 17/22
2022/0252121 A1 * 8/2022 Camozzi ................... G01L 1/26
2022/0260126 A1 * 8/2022 Camozzi ................. F16D 55/22
2023/0228631 A1 * 7/2023 Serra ..................... F16D 65/092 188/251 R
2023/0339446 A1 * 10/2023 Milanesi ................... B60T 8/52

FOREIGN PATENT DOCUMENTS

KR 10 2015 0138747 12/2015
KR 10 1847800 B1 4/2018
WO WO 2010 104502 A1 9/2010

* cited by examiner

MEASUREMENT APPARATUS AND EMB DEVICE INCLUDING SAME

CROSS-REFERENCE TO RELATED APPLICATION(S)

The present application claims priority to Korean Patent Application No. 10-2023-0130255 filed on Sep. 27, 2023, the entire contents of which is incorporated herein for all purposes by this reference.

BACKGROUND OF THE PRESENT DISCLOSURE

Field of the Present Disclosure

The present disclosure relates to a measurement apparatus and an electromechanical braking (EMB) device including the same.

Description of Related Art

Brake systems applied to vehicles include a hydraulic brake system and an EMB system. The hydraulic brake system is a system mechanically generating braking force using hydraulic pressure. The EMB system is a brake system generating braking force using an electric actuator, instead of hydraulic pressure.

Meanwhile, the hydraulic brake system may control braking force upon receiving feedback from a sensor on the pressure of fluid flowing in from outside a brake caliper.

In contrast, the EMB system controls braking force through feedback from a torque sensor located between a motor driveshaft inside the brake caliper and a ball screw shaft converting driving force of a rotation motion of the motor driveshaft into force pushing a brake pad.

Here, the brake caliper in which the torque sensor is located has high temperatures due to braking heat and a space for installing the torque sensor is narrow.

Thus, the EMB system includes a small, high-temperature durable, expensive torque sensor to measure inter-axle torque or utilizes a torque estimation method of determining torque through a current and voltage applied to an electric motor.

Here, torque estimation using the estimation method requires an accurate motor parameter, but it is virtually impossible to find a precise value of the motor parameter which is affected by various factors, such as impedance including many production errors, relative positions of a rotor and a stator, and mechanical characteristics.

Therefore, in the EMB system according to the related art, control is performed using a predicted feedback value including a large margin of error, compared to the actual margin, making it difficult to guarantee controlled performance.

The information included in this Background in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a measurement apparatus configured for accurately determining torque of an EMB device and which is easy to install, and an EMB device including the same.

According to an aspect of the present disclosure, an electromechanical braking device includes: a housing unit provided with a braking force generating unit therein: a power generating unit configured for providing driving force for braking force required by the braking force generating unit; and a measurement apparatus including one end portion connected to one side of the housing unit and the other end portion connected to the power generating unit, wherein braking torque is determined using axial reaction force generated by driving force greater than or equal to a rotation limit amount generated from the power generation unit.

The rotation limit amount may be a rotation amount of the power generating unit in a state in which the braking force generating unit moved by the driving force of the power generating unit is in contact with a brake disc and cannot move any further.

The measurement apparatus may include a first support portion, a second support portion, and a connection portion connecting the first support portion to the second support portion, wherein the first support portion is connected to the housing unit, and the second support portion is connected to the power generating unit.

The measurement apparatus may include a first support portion, a second support portion, and a connection portion connecting the first support portion to the second support portion, wherein the first support portion is connected to the housing unit, and the second support portion is connected to the power generating unit through a reducer.

The braking torque may be determined based on a degree of twisting of the connection portion.

The connection portion may be provided to form the same direction as an axial direction of the power generating unit.

The connection portion may be provided to form a preset angle with an axial direction of the power generating unit.

According to another aspect of the present disclosure, a measurement apparatus includes: a first support portion: a second support portion provided to face the first support portion; a connection portion connecting the first support portion to the second support portion; and a torque determining portion determining a braking torque based on twisting of the connection portion.

The connection portion may include a bar shape and may further include a strain gauge provided in the connection portion.

The strain gauge may be provided so that a distance between the strain gauge and the second support portion is closer than a distance between the strain gauge and the first support portion.

At least four strain gauges may be provided, and the strain gauges may be provided to form a Wheatstone bridge.

The connection portion may be connected to the first support portion and the second support portion, respectively, at right angles.

The connection portion may be connected to the first support portion and the second support portion at a preset angle.

The torque determining portion may be configured to determine the braking torque based on a change in resistance of the strain gauge.

The connection portion may include a coil shape, and the connection portion may include at least one strain gauge.

The torque determining portion may be configured to determine the braking torque based on a change in length of the connection portion.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
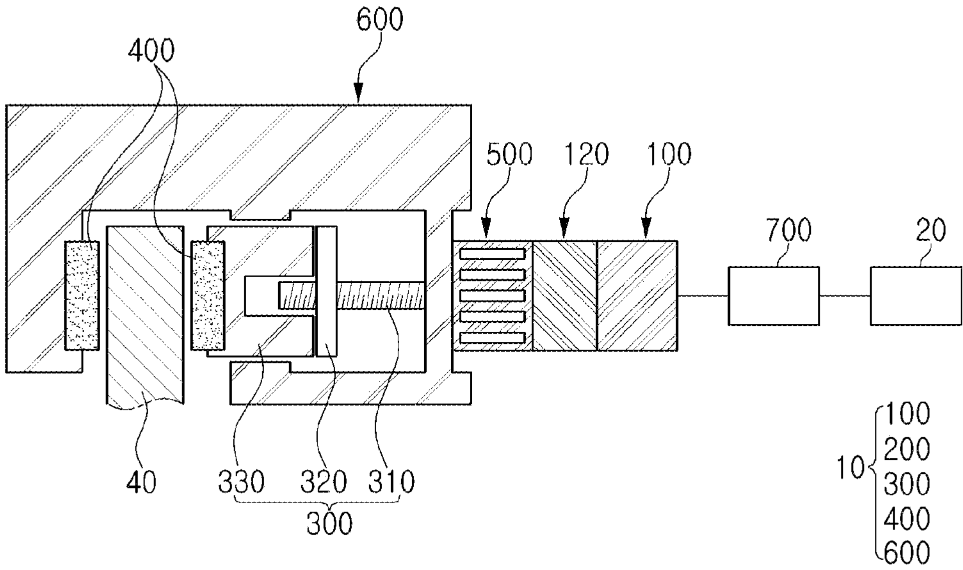
FIG. 1 is a conceptual diagram of an electromechanical braking (EMB) device according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure may be modified variably and may have various exemplary embodiments of the present disclosure, examples of which will be illustrated in drawings and described in detail. However, it is to be understood that the present disclosure is not limited to a specific disclosed form, but includes all modifications, equivalents, and substitutions without departing from the scope and spirit of the present disclosure.

Terms, such as 'first,' 'second,' etc., may be used to describe various components, but the components are not to be construed as being limited to the terms. The terms are used only to distinguish one component from another component. For example, the "first" component may be named the "second" component and the "second" component may also be similarly named the "first" component, without departing from the scope of the present disclosure. As used here, the term "and/or" includes any and all combinations of one or more of the associated listed items.

Terms used in the present specification are used only in order to describe specific exemplary embodiments rather than limiting the present disclosure. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification, including technical and scientific terms include the same meaning as those that are understood by those skilled in the art to which the present disclosure pertains. It must be understood that the terms defined by the dictionary are identical with the meanings within the context of the related art, and they should not be ideally or excessively formally defined unless the context clearly dictates otherwise.

Hereinafter, exemplary embodiments of the present disclosure will be described in detail with reference to the accompanying drawings.

Figure 2:
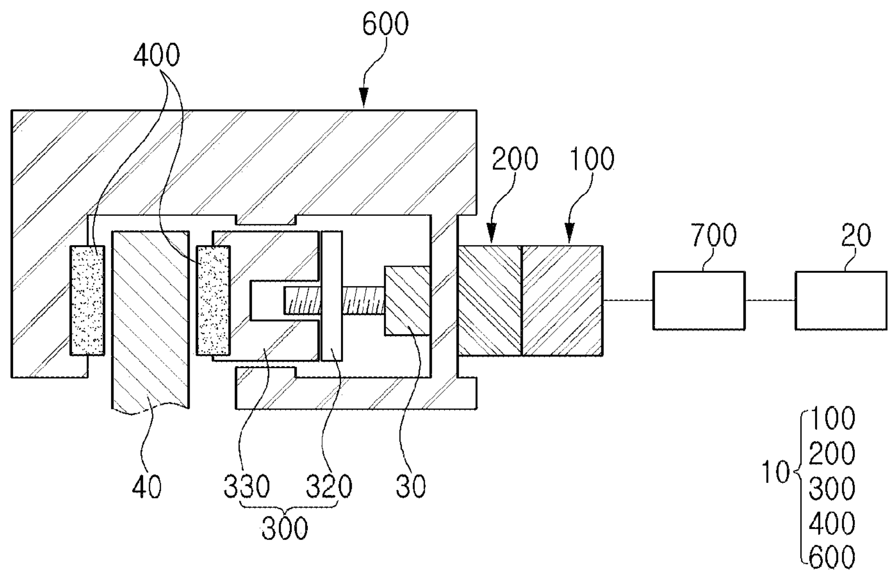
FIG. 2 is a conceptual diagram of an EMB device according to the related art.
Figure 3:
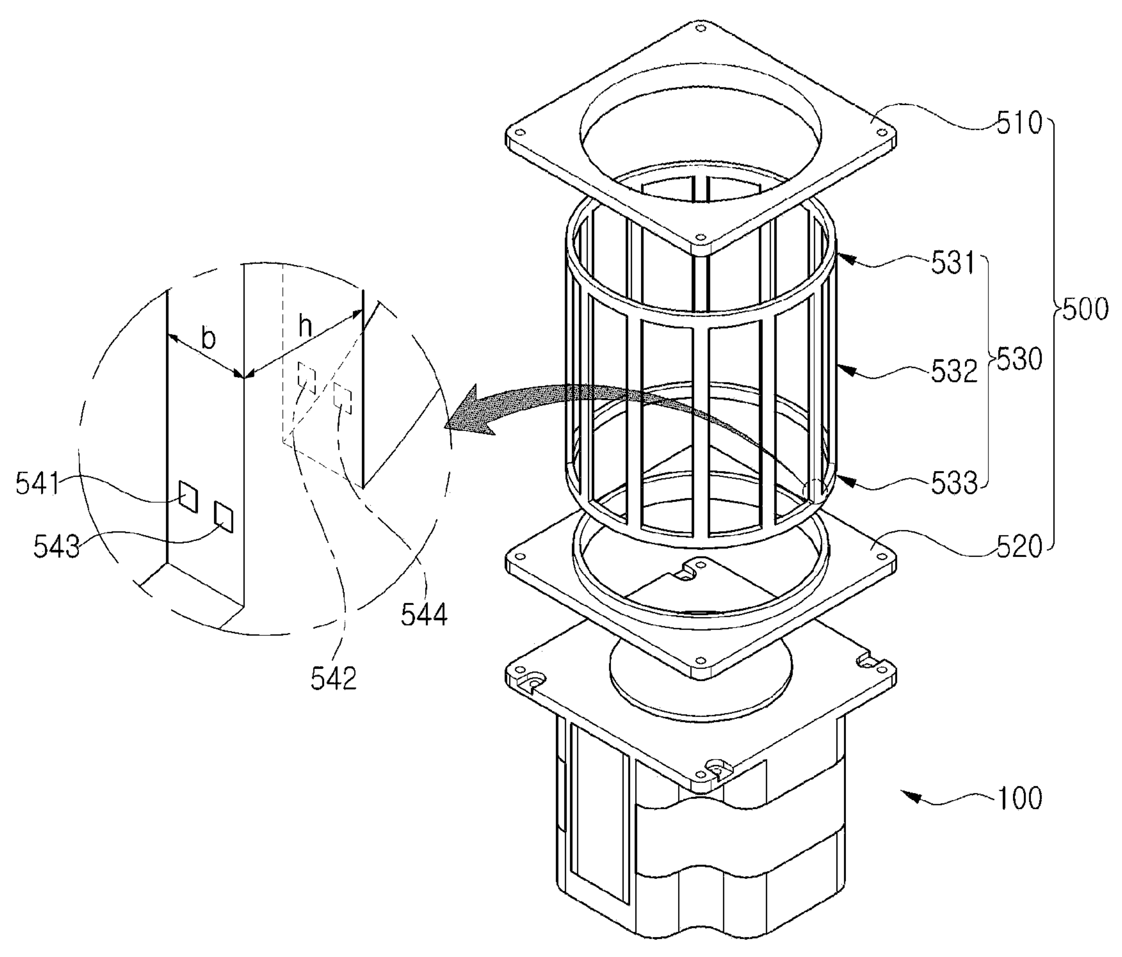
FIG. 3 is a perspective view of a measurement apparatus and a power generating unit according to an exemplary embodiment of the present disclosure.

FIG. 1 is a conceptual diagram of an electromechanical braking (EMB) device 10 including a measurement apparatus 500 according to an exemplary embodiment of the present disclosure, FIG. 2 is a conceptual diagram of an EMB device 10 according to the related art, and FIG. 3 is a perspective view of the measurement apparatus 500 according to an exemplary embodiment of the present disclosure.

Referring to FIG. 1, the EMB device 10 according to an exemplary embodiment of the present disclosure may be a device mounted on an individual wheel provided in a vehicle and generating braking force.

The EMB device 10 may be individually provided in each wheel, and the EMB device 10 provided in each wheel may be controlled by an EMB controller to individually generate braking force for each wheel.

The EMB controller 20 may be configured for controlling the EMB device 10. For example, a vehicle may be provided with four EMB devices 10 for each wheel, and the EMB controller 20 may be configured for controlling each of the four EMB devices 10.

Here, each EMB device 10 may include an individual EMB controller 20, and an EMB central controller may be configured for controlling each EMB device 10 through the individual EMB controller 20.

When the vehicle is driving, the EMB controller 20 may be configured to determine braking force to be generated by each EMB based on information, such as a pedal stroke amount of the vehicle, a wheel speed, longitudinal acceleration, and yaw.

The EMB device 10 may include a power generating unit 100, a power transmitting unit 200, a power converting unit 300, and a braking force generating unit 400.

The power generating unit 100 may provide a driving force for the braking force generating unit 400 to generate braking force. The power generating unit 100 may include an electric motor generating driving force upon receiving electricity, and the driving force may be a force generated by a rotation motion generated by the motor.

However, the power generating unit 100 is not limited to an electric motor and may be a pneumatic actuator generating driving force upon receiving air pressure, and various devices providing driving force through a rotation motion of a shaft may be applied.

The power generating unit 100 may further include a reducer 120 amplifying the driving force of the power generating unit 100 and transmitting amplified driving force. Here, the reducer 120 may be applied with various reduction ratios which may satisfy the type of vehicle, a user's needs, etc. For example, the reducer 120 may be spur gear reducer, helical gear reducer, worm gear reducer, bevel gear reducer, planetary gear reducer, etc.

The EMB device 10 according to an exemplary embodiment of the present disclosure may include a housing unit 600. The housing unit 600 may be fixed to a knuckle and connected to and supported by a vehicle body, and may support the EMB device 10.

The housing unit 600 may include the power converting unit 300 therein, may guide the braking force generating unit 400, and may be connected to the power generating unit 100 on one side thereof.

The power transmitting unit 200 may receive driving force generated by the rotation motion of the power generating unit 100 and transmit the received driving force to the power converting unit 300 through the housing unit 600. The power transmitting unit 200 may be a gear or a spindle and may be connected to the power generating unit 100 to receive rotational energy of the power generating unit 100.

The power converting unit 300 may convert the driving force of the rotation motion received by the power transmitting unit 200 into a linear motion.

For example, the power converting unit 300 may be a screw 310. When the driving force of the rotation motion received from the power transmitting unit 200 rotates the screw; a ball to which the piston 330 is coupled may move linearly along the screw.

Alternatively, the power converting unit 300 may include a bolt rotating integrally with the spindle, a nut 320 moving forwards and backwards according to the rotation of the bolt, and a piston 330 including the nut 320 on an inside thereof and moving together with the nut 320.

One end portion of the power converting unit 300 may be connected to the power transmitting unit 200 transmitting driving force of the rotation motion, and the other end portion thereof may be connected to the braking force generating unit 400.

The braking force generating unit 400 moves linearly in combination with the power converting unit 300 and may be configured to generate braking force by pressing a brake disc 40. For example, the braking force generating unit 400 may include at least one brake pad. Furthermore, the braking force generating unit 400 may be two brake pads provided to face each other with the brake disc 40 interposed therebetween.

The EMB device 10 may be configured to generate braking force by transmitting the driving force of the rotation motion generated by the power generating unit 100 to the braking force generating unit 400.

The EMB device 10 may transmit the driving force of the rotation motion generated by the power generating unit 100 to the braking force generating unit 400 through the power transmitting unit 200. The braking force generating unit 400 may convert the driving force of the rotation motion received through the power transmitting unit 200 into a driving force of a linear motion through the power converting unit 300.

The braking force generating unit 400 may be configured to generate braking force in the vehicle by pressing the brake disc 40 by adjusting a position of the braking force generating unit 400 by use of the driving force converted by the power converting unit 300.

Referring back to FIG. 2, the EMB device 10 according to the related art may include a torque sensor 30 inside the housing unit 600 to measure torque.

Because the inside of the housing unit 600 is adjacent to the braking force generating unit 400 generating frictional heat, the torque sensor 30 operating even in a high temperature environment was required.

Furthermore, as the power converting unit 300 and the braking force generating unit 400 are arranged together in a limited space inside the housing unit 600, there may be a problem in that space for installing the torque sensor 30 is narrow:

The EMB device 10 according to an exemplary embodiment of the present disclosure may further include a measurement apparatus 500 between the housing unit 600 and the power generating unit 100.

Referring to FIG. 3, the measurement apparatus 500 according to an exemplary embodiment of the present disclosure may include a connection portion 530 deformed by driving force continuously applied from the power generating unit 100, a first support portion 510 connected to one side of the connection portion 530 to couple the connection portion to the housing unit 600, a second support portion 520 connected to the other side of the connection portion 530 to couple the connection portion 530 to the power generating unit 100, and a strain gauge 540 provided in the connection portion 530.

Here, the second support portion 520 may be connected to the power generating unit 100 through the reducer 120.

After reaching a rotation limit amount, the connection portion 530 may be deformed by the driving force continuously applied from the power generating unit 100 and torque may be predicted by measuring the amount of deformation of the connection portion 530 using the strain gauge 540.

Here, the rotation limit amount may be the amount of axial rotation of the power generating unit 100 in a state in which the braking force generating unit 400 is fully pressing the brake disc 40 so that the braking force generating unit 400 cannot move any further.

The axial rotation caused by the driving force of the power generating unit 100 may be finally transmitted to the braking force generating unit 400, and the braking force generating unit 400 may move in the direction of the brake disk 40 to press the brake disk 40. Accordingly, even if the driving force of the power generating unit 100 continues to increase, the braking force generating unit 400 may press the brake disc 40 and may no further move.

In other words, the power generating unit 100 reaches the rotation limit amount, and the driving force generated by the power generating unit 100 is blocked by the braking force generating unit 400, which may no longer move, but axial reaction force may rather act on the power generating unit 100.

Here, the connection portion 530 included in the power generating unit 100 according to an exemplary embodiment of the present disclosure may be twisted due to the axial reaction force, and torque may be determined by measuring the twist.

The connection portion 530 may include a first connection portion 531 connected to the first support portion 510 connected to the housing unit 600, a third connection portion 533 connected to the second support portion 520 connected to the power generating unit 100, and a second connection portion 532 connecting the first connection portion 531 to the third connection portion 533 and including the strain gauge 540.

In other words, one side of the connection portion 530 may be coupled to the housing unit 600 to be fixedly supported, and the other side thereof may be coupled to the power generating unit 100 to be fixedly supported.

Therefore, if a rotation exceeding the rotation limit amount occurs in the EMB device 10, twisting may occur in the power generating unit 100 due to axial reaction force and twisting may also occur in the connection portion 530 including one side connected to the housing unit 600 coupled to the vehicle body and the other side connected to the power generating unit 100.

Here, by measuring the degree of twisting of the connection portion 530 through the strain gauge 540, the magnitude of torque generated in the EMB device 10 may be identified and the EMB controller 20 may be configured for controlling the power generating unit 100.

Referring back to FIG. 2, in the EMB device 10 according to the related art, the torque sensor 30 was disposed between the power transmitting unit 200 and the power converting unit 300 to identify torque.

Meanwhile, the space between the power transmitting unit and the power converting unit 300 may be very narrow and may have very high temperatures due to the braking frictional heat between the braking force generating unit 400 and the brake disc 40. Thus, the torque sensor 30 according to the related art required a small, durable, and expensive sensor.

Alternatively, the EMB device 10 according to the related art estimates torque using a current and voltage applied to the power generating unit 100 and the parameters (e.g., relative positions of the stator and the rotor of the motor, impedance, etc.) without the expensive torque sensor 30.

Meanwhile, the parameters of the power generating unit 100 had large production errors and deviations occurred depending on individual motors, and thus, it was difficult to obtain accurate parameter values.

As a result, the method of estimating torque using the current and voltage applied to the power generating unit 100 and the parameters of the power generating unit 100 inevitably involves errors, and because the EMB device 10 was controlled with erroneous torque estimate values, control performance deteriorated.

In contrast, the EMB device 10 according to an exemplary embodiment of the present disclosure is connected to the power generating unit 100 and coupled to the outside of the external housing, being less affected by braking heat generated in the brake disc 40 and the braking force generating unit 400 and less limited in space.

Figure 4:
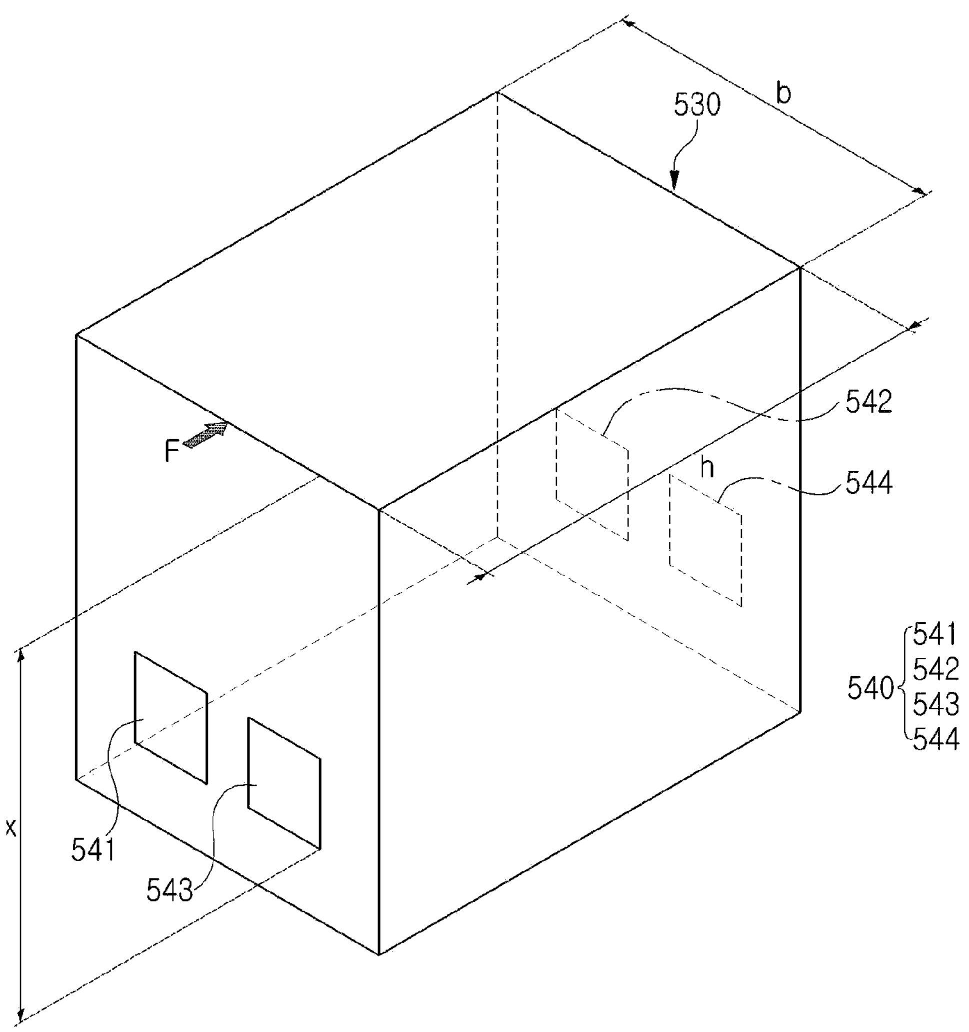
FIG. 4 is a diagram illustrating the principle of determining torque using a strain gauge according to an exemplary embodiment of the present disclosure.
Figure 5:
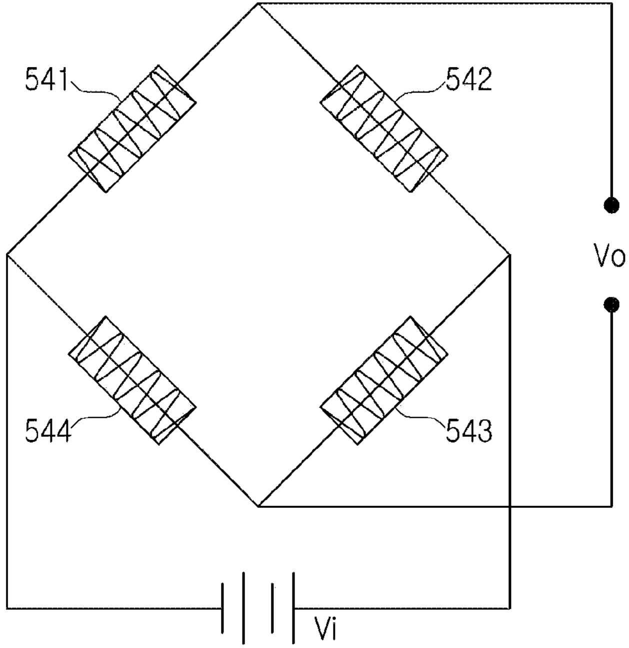
FIG. 5 is a diagram illustrating a Wheatstone bridge formed by a strain gauge according to an exemplary embodiment of the present disclosure.

FIG. 4 is a diagram illustrating the principle of determining torque using the strain gauge 540 according to an exemplary embodiment of the present disclosure, and FIG. 5 illustrates a Wheatstone bridge formed by the strain gauge 540 according to an exemplary embodiment of the present disclosure.

Here, the strain gauge 540 may be configured for measuring deformation of an object using a piezoresistive effect, in which an object is displaced by external pressure and resistance changes due to the generated displacement.

Here, strain may be measured using a Wheatstone bridge and the strain gauge 540.

For example, a Wheatstone bridge may be configured using strain gauges 540 (541, 542, 543, and 544) attached to the surface of the connection portion 530. Here, when the connection portion 530 is deformed by external force, resistance that changes as the length of the strain gauge 540 (541, 542, 543, and 544) stretches or contracts along with the connection portion 530 may be detected to measure a change in strain of the connection portion 530.

For example, when the strain gauge 540 (541, 542, 543, and 544) stretches, a cross-sectional area may decrease and electrical resistance may increase. Conversely, when the strain gauge 540 (541, 542, 543, and 544) contracts, the length may decrease and the cross-sectional area may increase, which may result in a decrease in electrical resistance.

Therefore, the change in resistance of the strain gauge 540 (541, 542, 543, and 544) which stretches or contracts together with the connection portion 530 may change the voltage or current of the Wheatstone bridge, the strain of the connection portion 530 may be measured based on the changed voltage or current of the Wheatstone bridge.

Furthermore, using the strain gauge 540 (541, 542, 543, and 544), data on a load and strain acting on the connection portion 530 may be measured, and the relationship between the load and strain may be analyzed based on the measured data.

Through the relationship between the load and strain, a load acting on the connection portion 530 or the measurement apparatus 500 may be measured through the strain measured from the strain gauge 540 (541, 542, 543, and 544).

In detail, with reference to FIG. 4, two strain gauges 540 may be attached to one side of the third connection portion 533 and two strain gauges 540 may be attached to the other side of the third connection portion 533 opposite to one side thereof.

Here, the strain gauge 540 may be provided to be close to the second support portion 520, but is not limited thereto.

Referring to FIG. 4 along with FIG. 3, the connection portion 530 may be bent according to an external force F corresponding to the axial reaction force. As the connection portion 530 is bent, the strain gauge 540 may be deformed, and resistance may change accordingly. External force may be measured by detecting changes in resistance with the Wheatstone bridge. Tensile force of the first strain gauge 541 and the third strain gauge 543 may be equal to compressive force of the second strain gauge 542 and the fourth strain gauge 544 by the external force.

Therefore, the ratio of the tension of the first strain gauge 541 and the third strain gauge 543 and the compression of the second strain gauge 542 and the fourth strain gauge 544 may be proportional to the bending of the connection portion 530.

Here, if the same resistance values of the first strain gauge 541, the second strain gauge 542, the third strain gauge 543, and the fourth strain gauge 544 are used, the resistance may change proportionally.

Through this, a voltage ratio between a first voltage Vi and a second voltage Vo of the Wheatstone bridge including the first strain gauge 541, the second strain gauge 542, the third strain gauge 543, and the fourth strain gauge 544 may also increase or decrease proportionally.

Therefore, the external force may be determined by a formula that combines the change in voltage difference and the bending of the connection portion 530, as expressed in Equation 1 below.

$$\frac{\Delta R_1}{R_1} = \frac{\Delta R_2}{R_2} = \frac{\Delta R_3}{R_3} = \frac{\Delta R_4}{R_4} = \frac{6S_gFx}{Ebh^2} \quad \text{[Equation 1]}$$

Here, $S_g$ may be a fatigue strength of a material, F may be the external force, x may be the position to which the external force is applied, E may be a longitudinal modulus of elasticity, b may be a thickness of the connection portion 530 to which the strain gauge 540 is attached, and h may be a width of the connection portion 530 to which the strain gauge 540 is attached.

Using Equation 1 described above, the measurement apparatus 500 may identify the load acting on the measurement apparatus 500 or the change in strain of the connection portion 530.

Here, the measurement apparatus 500 may store the relationship of the torque actually acting on the measurement apparatus 500 along with the change in load or strain of the connecting portion 530 measured through the measurement apparatus 500.

The measurement apparatus 500 according to an exemplary embodiment of the present disclosure may further include a torque determining portion 700.

The torque determining portion 700 may measure strain through a change in resistance or current of the strain gauge 540 connected to the Wheatstone bridge or determine a load through a change in strain.

Furthermore, the torque determining portion 700 may be configured to determine torque acting on the measurement apparatus 500 through a change in strain or load measured through the strain gauge 540.

The torque determining portion 700 may be implemented a non-volatile memory configured to store an algorithm configured to determine torque through a strain or load measured through the strain gauge 540 or data regarding a software command that reproduces the algorithm and a processor configured to perform an operation described below using the data stored in the corresponding memory.

Here, the memory and the processor may be implemented as individual chips. Alternatively, the memory and the processor may be implemented as a single chip integrated with each other. A processor may be one or more processors.

The present disclosure may have various exemplary embodiments in which the shape of the connection portion 530 varies.

Figure 6:
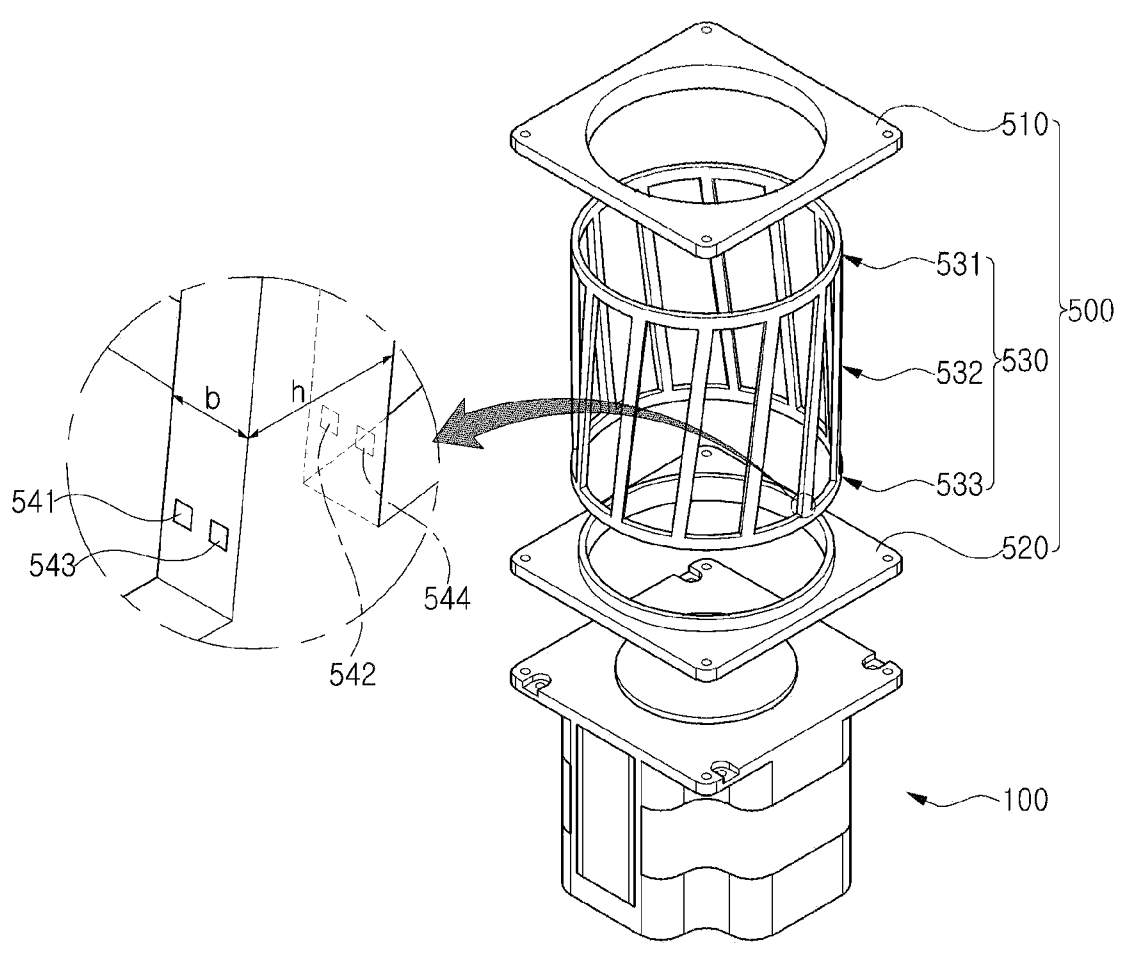
FIG. 6 is a perspective view of a measurement apparatus and a power generating unit according to another exemplary embodiment in an exemplary embodiment of the present disclosure.

FIG. 6 is a perspective view of the measurement apparatus 500 and the power generating unit 100 according to another exemplary embodiment in an exemplary embodiment of the present disclosure.

Referring to FIG. 6, in the measurement apparatus 500 according to another exemplary embodiment in an exemplary embodiment of the present disclosure, the second connecting portion 532 connecting the first connecting portion 531 to the third connecting portion 533 may form a predetermined angle. By forming the second connection portion 532 at a predetermined angle between the first connection portion 531 and the third connection portion 533, rigidity of the second connection portion 532 in a twisting direction may be improved.

Figure 7:
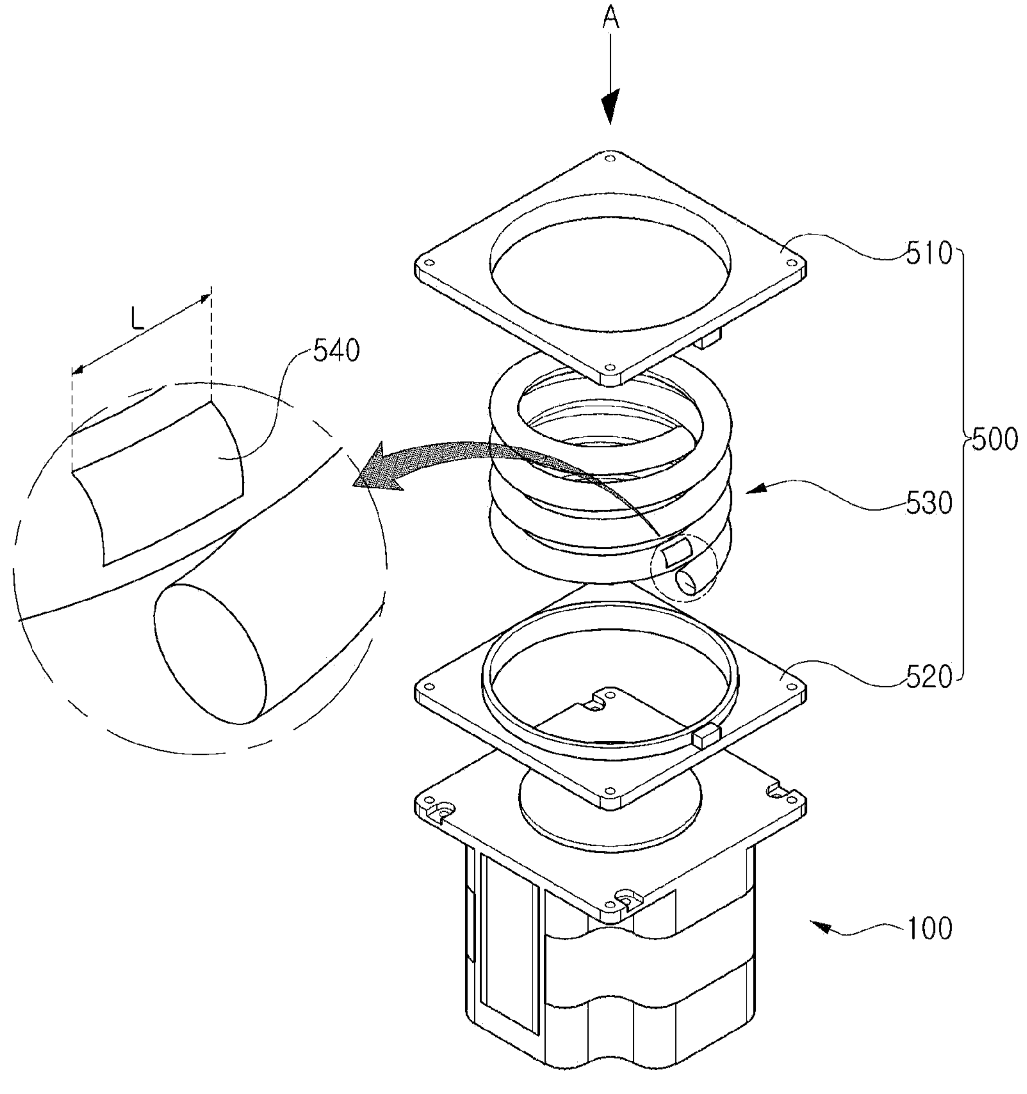
FIG. 7 is a perspective view of a measurement apparatus and a power generating unit according to another exemplary embodiment in an exemplary embodiment of the present disclosure.
Figure 8:
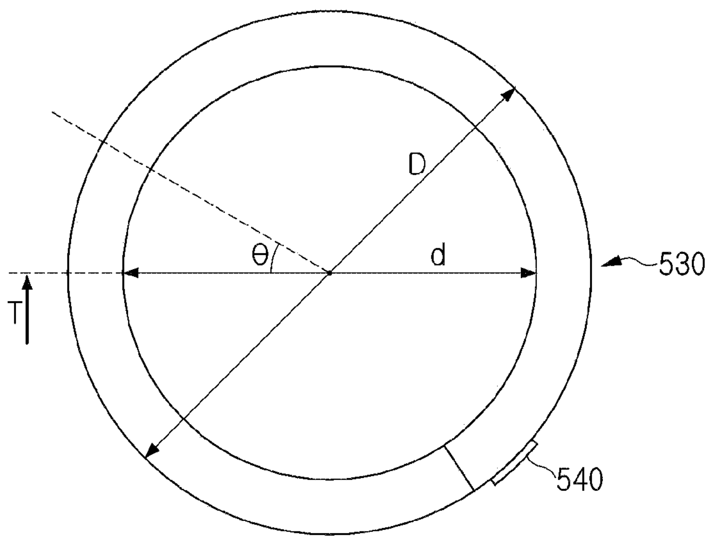
FIG. 8 illustrates a connection portion of another exemplary embodiment in an exemplary embodiment of the present disclosure viewed in direction A.

FIG. 7 is a perspective view of the measurement apparatus 500 and the power generating unit 100 according to another exemplary embodiment in an exemplary embodiment of the present disclosure, and FIG. 8 illustrates the connection portion 530 of another exemplary embodiment in an exemplary embodiment of the present disclosure viewed in direction A.

Referring to FIG. 7, in another exemplary embodiment in an exemplary embodiment of the present disclosure, the connection portion 530 may be formed of an elastic body including the shape of a coil.

The measurement apparatus 500 according to another exemplary embodiment in an exemplary embodiment of the present disclosure may measure torque using at least one strain gauge 540 provided in a portion of a coil-shaped connection portion 530.

A method of measuring torque in another exemplary embodiment in an exemplary embodiment of the present disclosure will be described with reference to FIG. 8 together with FIG. 7.

The coil-shaped connection portion 530 may be twisted in a direction in which torque acts, and a length of the coil-shaped connection portion 530 may change depending on the action of torque. Therefore, torque acting on the measurement apparatus 500 may be measured by measuring the change in length of the coil-shaped connection portion 530 through the strain gauge 540.

Referring to FIG. 8, when torque acts on the connection portion 530, the connection portion 530 may rotate by a predetermined angle to correspond to a magnitude of the torque, and because both end portions of the connection portion 530 are fixed to each other, the length of the connection portion 530 may change in proportion to the angle at which the connection portion 530 rotates.

First, a twist angle of the coil-shaped connection portion 530 may be identified through Equation 1 expressed below.

$$T = \frac{GJ\theta}{I} \quad \text{[Equation 2]}$$

Here, T may be torque Nm acting on the coil-shaped connection portion 530, θ may be the twist angle, I may be a total length of the coil-shaped connection portion 530 (*m*), G may be a shear modulus (N/m^2) of the coil-shaped connection portion 530, and J may be a polar moment of inertia (m^4) of the coil-shaped connection portion 530.

The polar moment of inertia of the coil-shaped connection portion 530 may be determined using Equation 3 expressed below.

$$J = \pi\frac{D^4 - d^4}{32N} \quad \text{[Equation 3]}$$

Here, D may be an external diameter of the coil-shaped connection portion 530 and d may be an internal diameter of the coil-shaped connection portion 530, and N may be the number of coils of the coil-shaped connection portion 530.

Furthermore, the twist angle may be determined using the strain gauge 540 through Equation 4 expressed below.

$$\theta = \frac{(L1 - L0) * 180}{K\pi L0}$$ [Equation 4]

Here, L1 may be a length measured using the strain gauge 540 after deformation, L0 may be a length measured using the strain gauge 540 before deformation, and K may be a spring constant of the coil-shaped connection portion 530.

Here, the shear modulus may be a physical quantity acting on the spring in a magnetic field, and the shear modulus may vary depending on the magnetic characteristics of the spring. Furthermore, the spring constant may be a physical quantity related to elasticity determined by the physical properties of a material and the shape of the spring.

The measurement apparatus 500 including the coil-shaped connection portion 530 may measure a deformation angle according to torque using the strain gauge 540, and torque acting on the measurement apparatus 500 may be directly measured through the aforementioned equation 2.

The measurement apparatus 500 including the coil-shaped connection portion 530 may have lower rigidity in a torsional direction than those of other exemplary embodiments and may have the advantage of being able to measure torque more precisely in response to a minute change in torque.

In the order in which the measurement apparatus 500 measures torque according to an exemplary embodiment of the present disclosure, driving force of the rotation motion generated by the power generating unit 100 may be transmitted to the power transmitting unit 200. The power transmitting unit 200 may transmit the driving force of the rotation motion generated by the power generating unit 100 to the power converting unit 300 to change the driving force of the rotation motion into a linear motion force and transmit the same to the braking force generating unit 400. At least one brake pad included in the braking force generating unit 400 may press the brake disc 40 to generate braking force.

Here, the braking force generating unit 400 may fully press the brake disc 40, and thus, the power generating unit 100 may continuously transmit the driving force of the rotation motion in a state in which the braking force generating unit 400 cannot move any further.

In the instant case, the driving force generated by the power generating unit 100 is blocked by the braking force generating unit 400, which may not move, and axial reaction force may instead act on the power generating unit 100.

Here, the measurement apparatus 500 in an exemplary embodiment of the present disclosure has one end portion coupled to the power generating unit 100 and the other end portion coupled to the housing unit 600, so that twisting may occur due to the axial reaction force, and torque may be determined by measuring the twisting.

Twisting may occur in the measurement apparatus 500 due to axial reaction force, and deformation of the connection portion 530 due to the twisting may be measured or a load according to the deformation may be measured. Furthermore, data on the deformation or load corresponding to the torque acting on the measurement apparatus 500 may be generated, or a torque value corresponding to the amount of deformation or load may be calibrated and stored in advance, and torque may be measured using the deformation or load of the connection unit 530.

The measurement apparatus 500 according to an exemplary embodiment of the present disclosure may be provided on the outside of the housing unit 600 covering the braking force generating unit 400 of the EMB device 10, minimizing the influence of braking heat generated when the vehicle is braked.

Because the measurement apparatus according to an exemplary embodiment of the present disclosure is provided outside the housing unit including a limited space, the measurement apparatus may be easily mounted in the EMB device.

Because the measurement apparatus according to an exemplary embodiment of the present disclosure is provided outside the housing unit of the EMB device including the braking force generating unit therein, the influence of high-temperature braking heat generated during braking on the measurement apparatus may be minimized, accurately measuring torque.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured for the present disclosure or may be publicly known and available to those who are skilled in the field of computer software.

Examples of the computer readable medium may include a hardware device, such as ROM, RAM, and flash memory, which are configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electromechanical braking apparatus comprising:
- a braking force generating unit;
- a housing unit provided with the braking force generating unit therein;
- a power generating unit configured for providing driving force for braking force required by the braking force generating unit; and
- a measurement apparatus including a first end portion connected to one side of the housing unit and a second end portion connected to the power generating unit,
- wherein braking torque of the electromechanical braking apparatus is determined using axial reaction force generated by driving force greater than or equal to a rotation limit amount generated from the power generation unit.

2. The electromechanical braking apparatus of claim 1, wherein the rotation limit amount is a rotation amount of the power generating unit in a state in which the braking force generating unit moved by the driving force of the power generating unit is in contact with a brake disc of the electromechanical braking apparatus and cannot move any further.

3. The electromechanical braking apparatus of claim 1,
- wherein the measurement apparatus includes a first support portion, a second support portion, and a connection portion connecting the first support portion to the second support portion, and
- wherein the first support portion is connected to the housing unit, and the second support portion is connected to the power generating unit.

4. The electromechanical braking apparatus of claim 3,
- wherein the first support portion is connected to the housing unit, and the second support portion is connected to the power generating unit through a reducer.

5. The electromechanical braking apparatus of claim 3, wherein the braking torque is determined based on a degree of twisting of the connection portion.

6. The electromechanical braking apparatus of claim 5, wherein the connection portion includes a bar shape and further includes a strain gauge provided in the connection portion.

7. The electromechanical braking apparatus of claim 6, wherein the strain gauge is provided so that a distance between the strain gauge and the second support portion is closer than a distance between the strain gauge and the first support portion.

8. The electromechanical braking apparatus of claim 6, wherein the braking force generating unit further includes a torque determining portion configured to determine the braking torque based on a change in resistance of the strain gauge.

9. The electromechanical braking apparatus of claim 3, wherein the connection portion includes a coil shape, and the connection portion includes at least one strain gauge.

10. The electromechanical braking apparatus of claim 3, wherein the connection portion is provided to form a same direction as an axial direction of the power generating unit.

11. The electromechanical braking apparatus of claim 3, wherein the connection portion is provided to form a preset angle with an axial direction of the power generating unit.

12. A measurement apparatus comprising:

a first support portion;

a second support portion provided to face the first support portion;

a connection portion connecting the first support portion to the second support portion; and a torque determining portion configured for determining a braking torque based on twisting of the connection portion.

13. The measurement apparatus of claim 12, wherein the connection portion includes a bar shape and further includes a strain gauge provided in the connection portion.

14. The measurement apparatus of claim 13, wherein the strain gauge is provided so that a distance between the strain gauge and the second support portion is closer than a distance between the strain gauge and the first support portion.

15. The measurement apparatus of claim 13, wherein at least four strain gauges are provided, and the strain gauges are provided to form a Wheatstone bridge.

16. The measurement apparatus of claim 12, wherein the connection portion is connected to the first support portion and the second support portion, respectively, at right angles.

17. The measurement apparatus of claim 12, wherein the connection portion is connected to the first support portion and the second support portion at a preset angle.

18. The measurement apparatus of claim 13, wherein the torque determining portion is configured to determine the braking torque based on a change in resistance of the strain gauge.

19. The measurement apparatus of claim 12, wherein the connection portion includes a coil shape, and the connection portion includes at least one strain gauge.

20. The measurement apparatus of claim 19, wherein the torque determining portion is configured to determine the braking torque based on a change in length of the connection portion.

* * * * *